US009035743B2

(12) United States Patent
Omar et al.

(10) Patent No.: US 9,035,743 B2
(45) Date of Patent: May 19, 2015

(54) SONG SELECTION BASED UPON AXIAL PEN PRESSURE (71) Applicant: New York University, New York, NY (US)

(72) Inventors: Mohammed Yaseer Omar, Abu Dhabi (AE); Abdel Razzaq Sami Alsharif, Abu Dhabi (AE); Ramesh Jagannathan, Abu Dhabi (AE)

(73) Assignee: New York University, New York, NY (US)

( * ) Notice: Subject to any disclaimer, the term of this patent is extended or adjusted under 35 U.S.C. 154(b) by 362 days.

(21) Appl. No.: 13/688,402

(22) Filed: Nov. 29, 2012

(65) Prior Publication Data

US 2013/0147597 A1    Jun. 13, 2013

Related U.S. Application Data

(60) Provisional application No. 61/565,838, filed on Dec. 1, 2011.

(51) Int. Cl.
| | |
|---|---|
| *H04L 7/00* | (2006.01) |
| *G08B 21/00* | (2006.01) |
| *G01L 5/16* | (2006.01) |
| *H04M 3/42* | (2006.01) |
| *H04M 3/00* | (2006.01) |
| *G06F 3/01* | (2006.01) |
| *G10H 1/40* | (2006.01) |
| *H04B 1/02* | (2006.01) |
| *H04M 1/725* | (2006.01) |
| *B43K 29/00* | (2006.01) |
| *G06F 3/0354* | (2013.01) |
| *B43K 29/08* | (2006.01) |
| *B43K 29/10* | (2006.01) |
| *G11B 27/10* | (2006.01) |
| *G11B 27/34* | (2006.01) |

(52) U.S. Cl.
CPC ............... *H04B 1/02* (2013.01); *H04B 1/3888* (2013.01); *H04M 1/72558* (2013.01); *H04M 2250/12* (2013.01); *B43K 29/00* (2013.01); *G06F 3/03545* (2013.01); *B43K 29/004* (2013.01); *B43K 29/005* (2013.01); *B43K 29/08* (2013.01); *B43K 29/10* (2013.01); *G11B 27/105* (2013.01); *G11B 27/34* (2013.01)

(58) Field of Classification Search
USPC ................... 340/614, 661, 666, 4.42; 84/612; 73/865.4; 455/414.1, 419
See application file for complete search history.

(56) References Cited

U.S. PATENT DOCUMENTS

| | | | | |
|---|---|---|---|---|
| 7,521,623 | B2 * | 4/2009 | Bowen | 84/612 |
| 7,921,369 | B2 * | 4/2011 | Bill | 715/753 |

(Continued)

OTHER PUBLICATIONS

Oliver et al., "MPTrain: A Mobile, Music and Physiology-Based Personal Trainer", *Microsoft Corporation*, Mar. 2006, 17 pages, Technical Report, MSR-TR-2006-31, http//www.research.microsoft.com.

*Primary Examiner* — George Bugg
*Assistant Examiner* — Munear Akki
(74) *Attorney, Agent, or Firm* — Foley & Lardner LLP (57) ABSTRACT

Methods, systems, and apparatuses, including computer programs encoded on computer readable media, for determining, using a pressure sensor, pressure data comprising a pressure indication and a time indication. A first mood is determined based upon the pressure data and one or more songs are selected based upon the determined first mood. A playlist is modified based upon the selected one or more songs, wherein the modified playlist comprises the selected one or more songs and the modified playlist is played. Song data, based upon the modified playlist, is wirelessly transmitted to a remote device.

22 Claims, 5 Drawing Sheets

(56) References Cited

U.S. PATENT DOCUMENTS

| | | |
|---|---|---|
| 2005/0250994 A1* | 11/2005 | Krullaards .................... 600/300 |
| 2006/0132455 A1* | 6/2006 | Rimas-Ribikauskas et al. ............................ 345/173 |
| 2007/0113725 A1* | 5/2007 | Oliver et al. .................... 84/612 |
| 2009/0022343 A1* | 1/2009 | Van Schaack et al. ......... 381/309 |
| 2009/0116684 A1* | 5/2009 | Andreasson .................. 382/100 |
| 2010/0011388 A1* | 1/2010 | Bull et al. .......................... 725/9 |
| 2010/0229094 A1* | 9/2010 | Nakajima et al. ............. 715/727 |
| 2010/0328088 A1* | 12/2010 | Lin et al. ....................... 340/666 |

* cited by examiner

SONG SELECTION BASED UPON AXIAL PEN PRESSURE

CROSS-REFERENCE TO RELATED PATENT APPLICATIONS

This application claims the benefit under 35 USC 119(e) of U.S. Application No. 61/565,838, filed Dec. 1, 2011, the contents of which are incorporated herein by reference in its entirety.

BACKGROUND

A music listener's mood can affect the user's selection of music that is to be played. Listeners can manually search a collection of music for particular songs based upon their mood. As the listener's mood changes, the listener can search for new music to be played.

SUMMARY

In general, one aspect of the subject matter described in this specification can be embodied in methods for determining, using a pressure sensor, pressure data comprising a pressure indication and a time indication. A first mood is determined based upon the pressure data and one or more songs are selected based upon the determined first mood. A playlist is modified based upon the selected one or more songs, wherein the modified playlist comprises the selected one or more songs and the modified playlist is played. Song data, based upon the modified playlist, is wirelessly transmitted to a remote device. Other implementations of this aspect include corresponding systems, apparatuses, and computer-readable media configured to perform the actions of the method.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Figure 1:
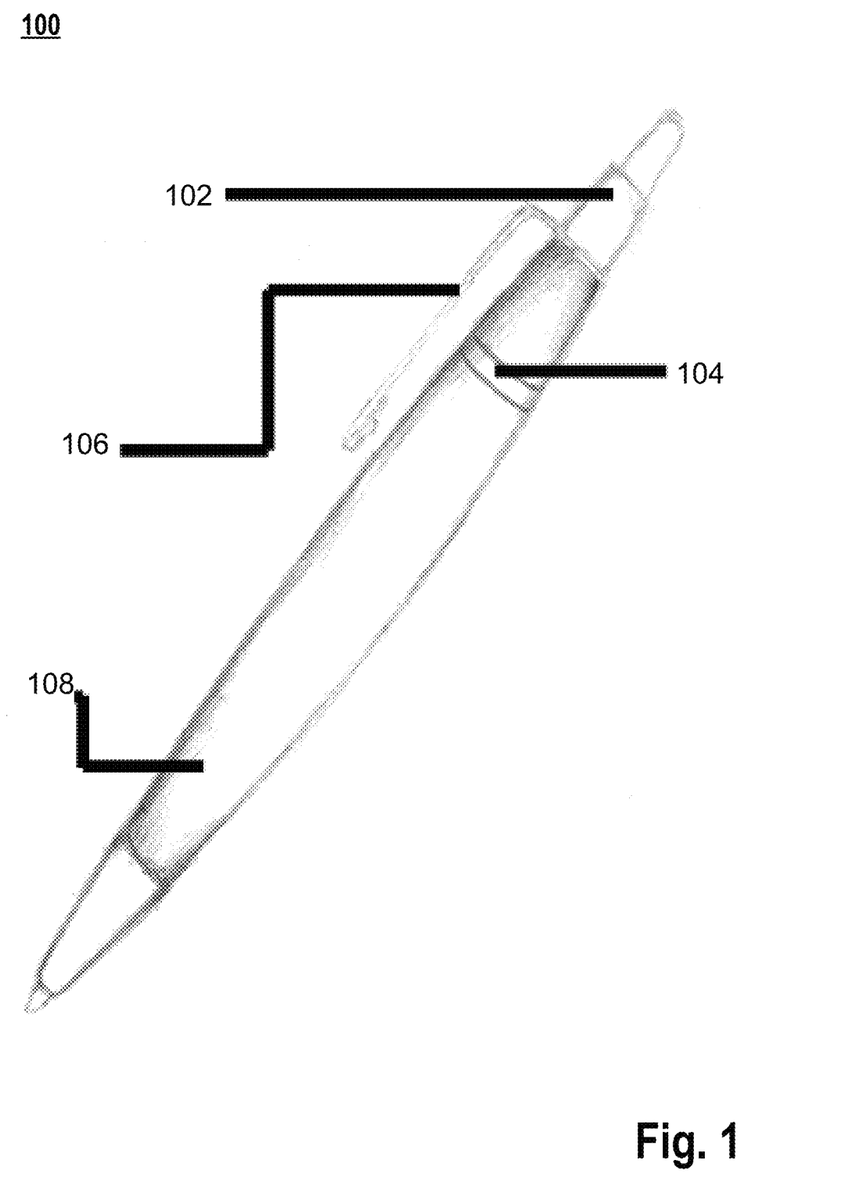
FIG. 1 illustrates a pressure sensing pen in accordance with an illustrative implementation.

This specification describes methods, devices, systems, etc., for selecting one or more songs based upon measured pressure levels. In one implementation, a user's grip on a pen is used to measure pressure levels. FIG. 1 illustrates a pressure sensing pen in accordance with an illustrative implementation. The pen 100 can include a connectivity module 102 that connects with external computing devices. For example, the connectivity module 102 can be a Bluetooth™ module or any other known wireless networking module. A motion sensor or a tilt sensor 106 can provide data indicating a physical state of the pen 100. In addition to the sensor 106, the pen 100 incorporates a pressure sensor 108. The pressure sensor 108 measure the amount of pressure exerted by a user of the pen 100. In some implementations, the pressure sensor 108 is located where the user grips the pen when writing. In these implementations, the pressure sensor 108 can measure the user's grip while writing. In one implementation, the pressure sensor 108 measures the axial pen pressure of the user. The pen 100 can also include a light-emitting diode (LED) 104 for providing feedback to a user. In some implementations, a pencil or stylus for an electronic device can be used instead of a pen. In still other implementations, other non-writing objects can be used. For example, a steering wheel, mug, phone, etc., can incorporate the pressure sensor to measure axial pressure.

In one implementation, two pens are paired together. In this implementation, a first pen can send/receive information from the paired second pen. For example, the amount of pressure and use of the first pen can be transmitted to the second pen. Data from the first pen can be transmitted to a computing device through the connectivity module 102. The data can then be transmitted across a network to the second pen. The second pen can provide an indication of the use of the first pen through the LED 104. For example, the data received by the second pen can include the axial pen pressure of the user of the first pen. The axial pen pressure can be correlated to a mood, for example, by using a catalog of emotional states correlated with axial pen pressures. The correlated mood can be expressed through the LED 104. The second user is, therefore, provided with an indication that the first pen is currently being used and also an indication of the mood of the person using the first pen. Each mood can have a particular color that is shown through the LED. For example, angry can be associated with red and happy can be associated with green.

Figure 2:
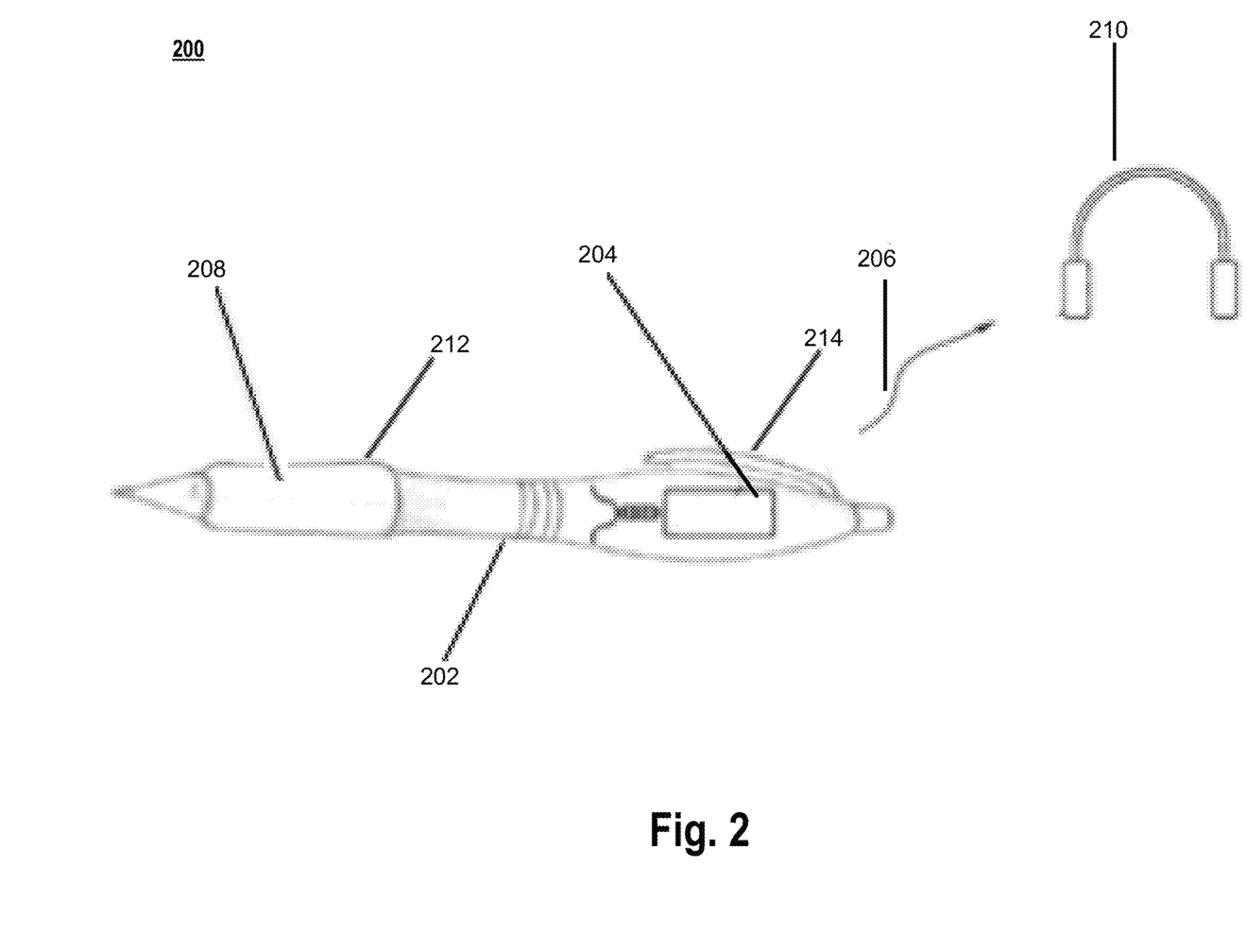
FIG. 2 illustrates a pressure sensing pen with an integrated music player in accordance with an illustrative implementation.

In another implementation, a pen can include a music player. FIG. 2 illustrates a pressure sensing pen 200 with an integrated music player in accordance with an illustrative implementation. The pen 200 includes a music player 202. The music player 202 can play music encoded in various digital formats such as, but not limited to, mp3. The pen 200 includes a pressure sensor 208 to monitor the amount of pressure applied to the pen 200. In one implementation, the pressure sensor 208 can be a pressure sensor ring. In some implementations, the pressure sensor 208 can be incorporated into a pen grip 212. The pen 200 can also include one or more motion sensors 214. The motion sensors 214 can be used to detect when the pen 200 is in a writing position. The pen can also include a display 204 that can be used to display information regarding the currently playing music, current playlist, and mood data. The mood data can include a name of the user's current mood, axial pen pressure data, etc. The pen 200 can include an on/off switch (not shown) that can be used to turn the music player 202 on or off. When the music player 202 is on it can play music data from the current song in the playlist. In one implementation, the music data is transmitted wirelessly over a network connection 206 to a set of headphones 210.

The pen 200 can change a playlist of the music player 202 based upon the perceived mood of a user. For example, data from the pressure sensor 208 can be used to determine a user's mood. In one implementation, pressure data also includes timing data. For example, timing data can include how long the axial pen pressure is above a predetermined threshold. Using the axial pen pressure and timing data, a mood can be determined. In one implementation, the pen 200 can include data that correlates axial pen pressure and timing data to a particular mood. For example, if the axial pen pressure is above a predetermined threshold for more than a predetermined time, a corresponding mood is determined. Based upon this mood, the music played by the music player 202 can be altered.

In one implementation, the music player 202 includes memory that stores a number of songs. These songs can be associated with one or more moods. After determining a user's mood, a playlist of music can be updated based upon the user's mood. Songs that were previously queued but are not associated with the user's mood can be removed and songs that are associated with the user's mood can be added to the playlist. The music player 202 plays the updated playlist, and the user's mood, therefore, changes the music played.

Figure 3:
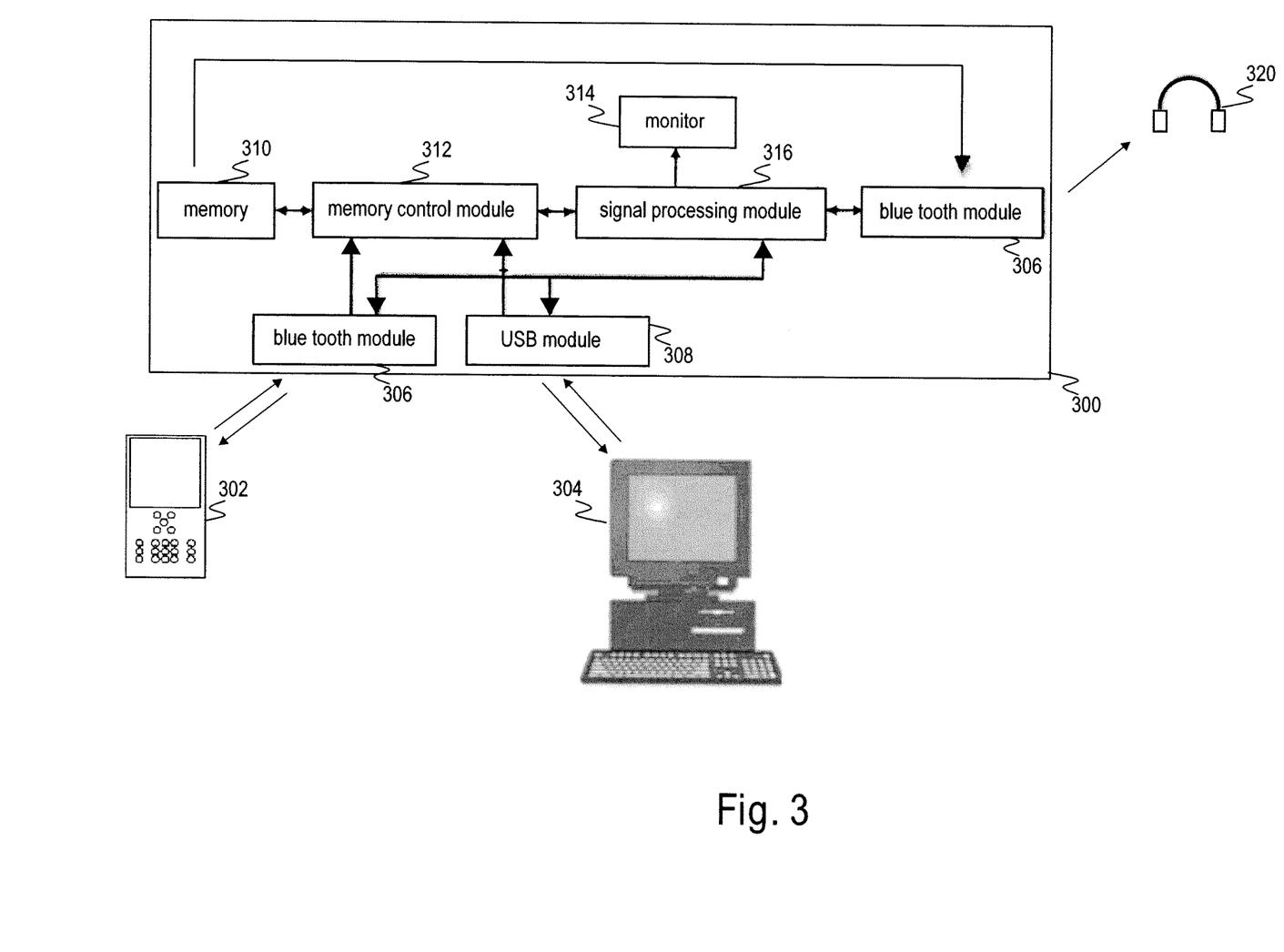
FIG. 3 illustrates a system including a pressure sensing pen with an integrated music player in accordance with an illustrative implementation.

In some implementations, a pen can connect to various other remote computing devices. FIG. 3 illustrates a system including a pressure-sensing pen with an integrated music player in accordance with an illustrative implementation. A pen 300 can include various modules for processing and accessing data. A Bluetooth module 306 can be used to send music data to a pair of headphones 320. In addition, the Bluetooth module 306 can be used to send/receive data from a computing device 302. For example, the computing device can be a cell phone, personal digital assistant (PDA), tablet computer, etc. A universal serial bus (USB) module 308 can also be used to connect to a computing device 304. For example, the USB module 308 can be used to send/receive data from a desktop computer, notebook computer, PDA, cell phone, etc. The pen 300 can also include a memory 310 for storing data, a signal processing module 316, a memory control module 312, and a monitor 314. In one implementation, the memory can be flash memory and the memory control module 312 can provide access to the memory for other modules. The monitor 314 can be used to display information to a user. For example, the display 314 can be used to provide information about a user's mood. The monitor can include, but is not limited to a liquid crystal display, light emitting diodes, etc.

In one implementation, the pen 300 includes a music player. The music player can play songs in a playlist that are stored in the memory 310. Computing devices 302 and/or 304 can be used to add or remove songs from the memory 310. Songs played by the music player can also be streamed to the pen 300 from the computing devices 302 or 304. In addition, songs can also be streamed from online sources using either the Bluetooth module 306 or the USB module 308. The memory 310 can include playlists that are associated with particular moods. In addition, the memory 310 can include data that correlates pressure data to particular moods. In this implementation, pressure data from the pen can be used to determine a user's mood. The determined mood can be used to determine a playlist that is to be played by the music player. In one implementation, the playlists can be stored in the memory 310 of the pen 300. The songs contained in the various playlists can be edited through computing devices 302 and 304. User can, therefore, select what songs will play for particular moods. In another implementation, playlists can be stored on a remote computing device. A determined mood can be sent to the remote computing device and in response can receive a playlist that is associated with the sent mood. In another implementation, the pressure data can be sent to a remote computing device, which can determine a mood based upon the received pressure data and select a corresponding playlist.

In some implementations, data relating to the use of the pen can be sent to remote devices, for example, computing devices 302 and/or 304. For example, when a new mood is determined or when a song is played, data can be sent to a remote computing device. In one implementation, this data can be sent to a social networking site. For example, the user's current mood and/or currently playing song can be sent to a social networking site. This data can then be shared publicly or to friends of the user on the social networking site. In one implementation, data from a group of pens can be collected. For example, each pen can send data to a remote computing device. This remote computing device can store the data from the group of pens or can send the data to another server. Once the data from the group of pens is collected at a single computing device, the mood data can be analyzed. For example, the effects on users' moods of playing one or more particular songs can be analyzed. As another example, a group of pens can be distributed to a class of students. Mood data can be collected and analyzed over a particular test, lecture, class, day, etc.

In another implementation, playlists that are independent of a user's mood can be played. In this implementation, the pen 300 plays the songs in the mood-independent playlist as is known in the art. The user's mood, however, can still alter the music that is played. In this implementation, a user's mood can be determined and the mood's corresponding playlist can be combined with the independent playlist. If the user's mood changes, any song added to the combined playlist based upon a previous mood is removed, leaving the original independent playlist. The updated mood's playlist can then be merged with the independent playlist.

In some implementations, the mood of the user is not always determined. In one implementation, only when a pen is actively being used is a user's mood determined. For example, only when motion sensors detect that the pen is in an upright position and the pressure sensors sense pressure is the user's mood determined. Pressure data can also be used to control the music player. For example, when a user exerts an axial pen pressure above a threshold for a particular period of time, the music player can turn on. In another implementation, sensed pressure can be used to control the music player. Example controls include but are not limited to changing the volume of the music, skipping to a next song, returning to a previous song, pausing, rewinding the current song, fast forwarding the current song, etc. In one implementation, a known pattern of pressure is used to enter into a control mode. For example, a first squeeze followed by a release followed by a second squeeze within a short predetermined timeframe can be used to enter into a control mode. The monitor or the LED of the pen can indicate that the user has entered into control mode. Once in control mode, various pressure patterns sensed through the pressure sensor can be associated with controls. In addition, data from the motion sensor can be used to determine a particular control. As an example, a hard squeeze can continuously increase a volume of the music player until the pressure ceases. Continuing this example, a soft squeeze can continuously decrease a volume of the music player until the pressure ceases. Motion data can also be used. For example, moving the pen up or down can raise or lower the volume. Pressure data combined with motion data can also be used. For example, a pressure above a threshold can indicate that the user wants to change the volume of the music player. Moving the pen upwards or shaking the pen upwards can increase the volume, while moving or shaking the pen downwards can decrease the volume. Multiple squeezes can also be used to select a particular control. For example, two successive hard squeezes can skip to the next song in the current playlist. Alternatively, two shakes in one direction can skip to the next or previous song. Other pressure patterns can be used and the pressure patterns can correlate with a particular control. Control mode can be exited through either a particular pressure pattern or after not receiving pressure for an amount of time.

In one implementation, a target mood for a user can be set. For example, a user can set the target mood to happy. The user's mood can be monitored and songs can be selected based upon the user's current mood and the target mood. For example, if the user is angry, songs associated with an angry mood can be combined with happy songs. The selection of songs based upon the user's mood and the target mood can vary over time. For example, initially the user's mood can be used to select the majority of songs. In the above example, the first two songs selected can be angry songs and then a third can be a happy song. After some predetermined amount of time, the preference for selecting songs can switch to the target mood. Continuing our example, two of the next three songs can be happy songs and the remaining song can be an angry song.

In another implementation, two pens with music players are paired together. In this implementation, the music player selects songs based upon the moods of both pens. Each pen operates as an independent pen if the other paired pen is not currently being used. When both pens, however, are active the determined moods of both users are used to select songs for a playlist. In one implementation, songs can be selected by alternating between the moods of the two users. In another implementation, the paired pens can have a common target mood. In this implementation, the user's moods and the target mood are used to select songs. For example, if both users are sad, sad songs can be selected but happy songs, corresponding with a happy target mood, will also be selected. In this implementation, users can share their moods with another user and also have music selected that can improve moods and foster emotional connections between users.

Figure 4:
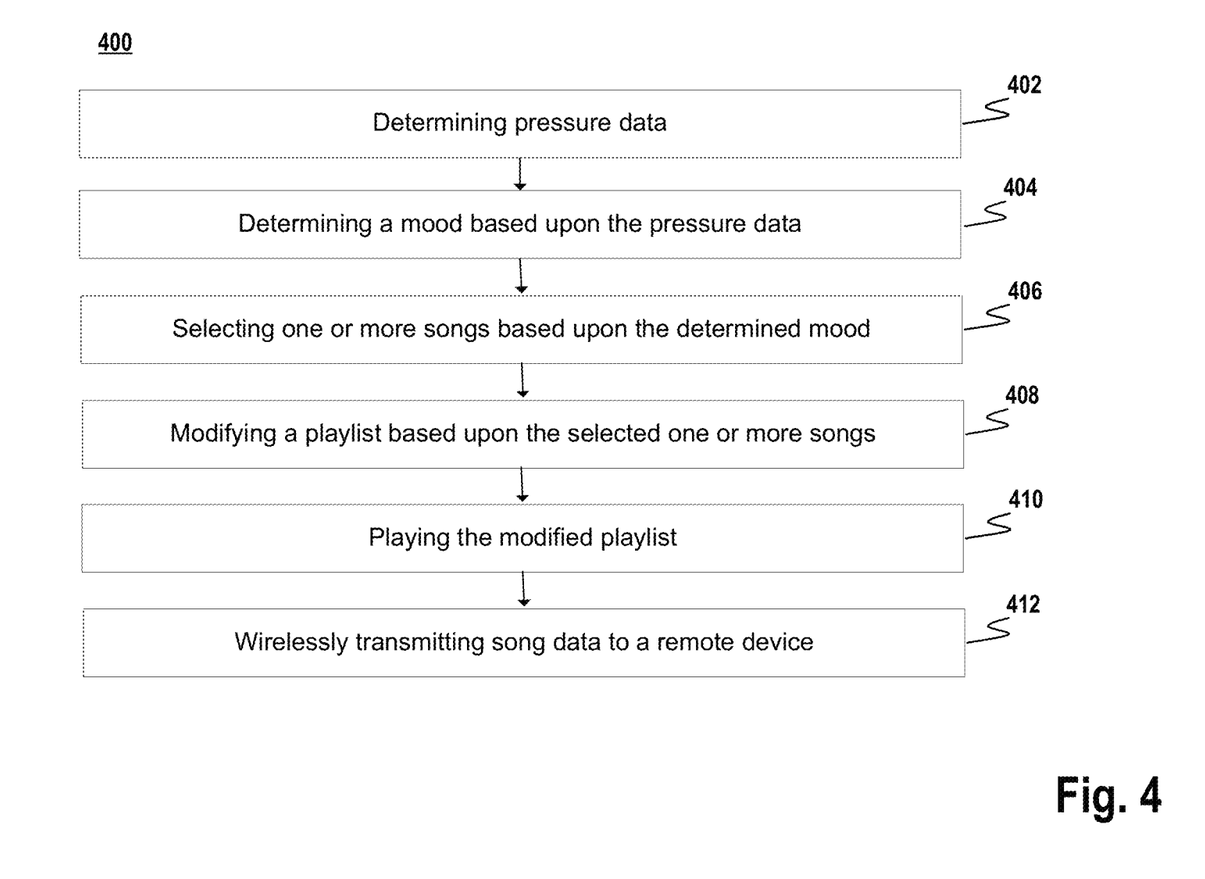
FIG. 4 illustrates a flow diagram of a process for selecting music based upon sensed pressure in accordance with an illustrative implementation.

FIG. 4 illustrates a flow diagram of a process for identifying particular members of a social network with an illustrative implementation. The process 400 can be implemented on a computing device. In one implementation, the process 400 is encoded on a computer-readable medium that contains instructions that, when executed by a computing device, cause the computing device to perform operations of the process 400.

The process includes determining pressure data (402). For example, pressure data can be received from a pressure sensor and can be used to calculate an axial pen pressure. In addition, pressure data includes a time indication. The time indication can be used to determine how long axial pen pressure has been applied. A first mood based upon the pressure data is determined (404). In some implementations, the first mood can be displayed in a monitor of a pen. In one implementation, a mood is determined using data that correlates axial pen pressure and time durations to a particular mood. For example, a mood can be determined if the axial pen pressure exceeds a predetermined amount for more than a predetermined duration. As a more detailed example, if the axial pen pressure is above an angry threshold for more than 0.5 seconds, then the mood of the user is determined to be angry. Based upon the determined mood, one or more songs are selected (406). In one implementation, a playlist of one or more songs is associated with moods. The corresponding playlist is selected based upon the user's mood. A playlist is modified based upon the selected one or more songs (408). In one implementation, the selected playlist replaces any existing playlist. In another implementation, the selected playlist can modify any existing playlist. For example, an existing playlist can include songs that are associated with a previous mood and can also contain songs that are mood independent. Mood-independent songs are those specified by a user that should be played regardless of the user's mood. Any song associated with a previous mood can be removed from the current playlist. Songs that are mood independent, however, are not removed from the playlist. Songs associated with the new mood can then be added to the current playlist. Once the playlist is updated, the updated playlist can be played (410). In one implementation, any currently playing song is finished prior to the new playlist being played. In another implementation, an updated playlist immediately takes effect, and currently playing songs can be stopped. Song data, corresponding to the currently playing song from the playlist, is wirelessly transmitted to a remote device for playback (412). In one implementation, the remote device is a pair of headphones. In other implementations, the remote device can be, but is not limited to, a hi-fi audio system, a cell phone, a PDA, a table computer, or any other computing device, etc.

In another implementation, the process 400 can also include sending a title of a currently playing song and/or the mood of the user to a social networking site. For example, when a change in the user's mood is detected, the change in the user's mood can be sent to a social networking site. In a paired-pen implementation, a second mood associated with a user of a remote device can be received. The first mood can also be sent to the corresponding pen. The second mood can be used along with the first mood to select one or more songs. These songs can then be added to the playlist. In this way, the moods of two users can be combined to select a playlist of songs that reflects the moods of both users. In another paired-pen implementation, a target mood can be associated with both pens. In this implementation, songs can be selected based upon the first mood, the second mood, and the target mood.

Figure 5:
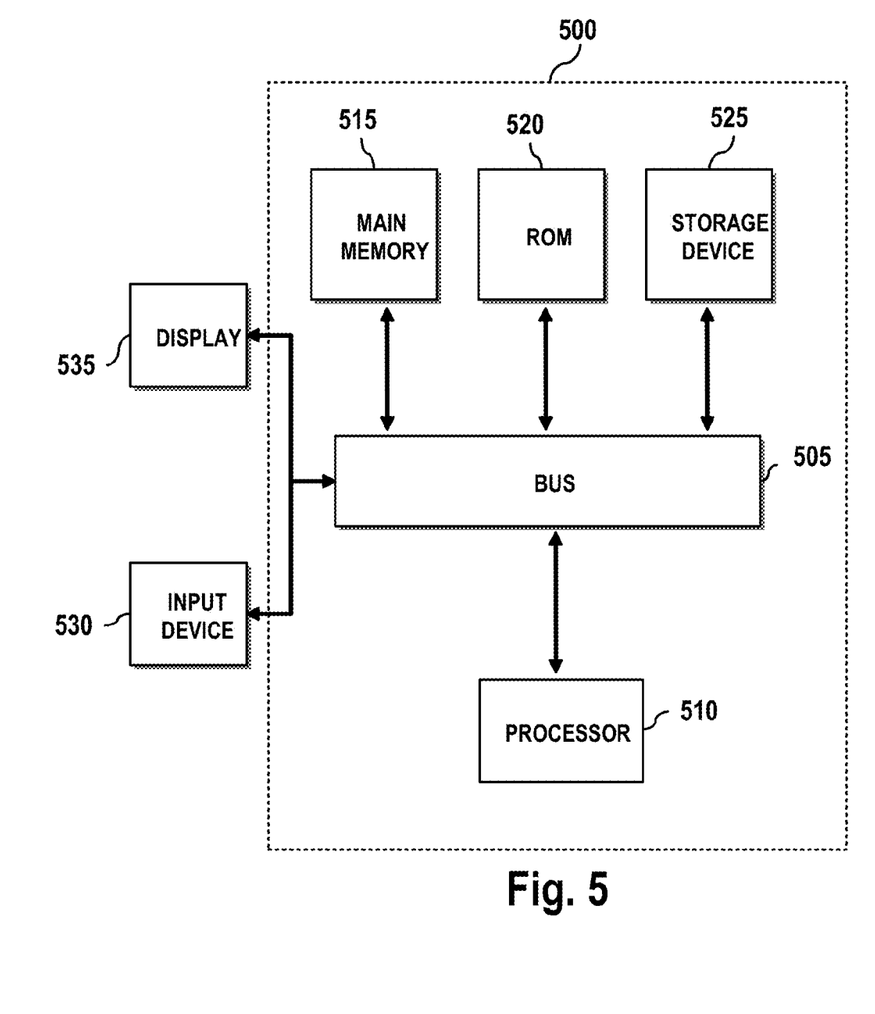
FIG. 5 is a block diagram of a computer system in accordance with an illustrative implementation.

FIG. 5 is a block diagram of a computer system in accordance with an illustrative implementation. The computer system or computing device 500 can be used to implement a pen in accordance with one or more implementations of the present invention. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 510 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

According to various implementations, the processes described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   determining, using a pressure sensor, pressure data comprising a pressure indication and a time indication;
   determining a first mood based upon the pressure data;
   selecting one or more songs based upon the determined first mood;
   modifying a playlist based upon the selected one or more songs, wherein the modified playlist comprises the selected one or more songs;
   playing the modified playlist; and
   wirelessly transmitting song data based upon the modified playlist to a remote device.

2. The method of claim 1, wherein the pressure data comprises an axial pen pressure.

3. The method of claim 1, further comprising displaying a title of a currently playing song.

4. The method of claim 1, wherein the remote device is a set of headphones.

5. The method of claim 1, wherein the remote device is a hi-fi audio system.

6. The method of claim 1, further comprising:
   receiving a song from a remote computing device; and
   storing the song in memory.

7. The method of claim 1, wherein determining the first mood comprises determining if the axial pen pressure is above a predetermined threshold for a predetermined period of time based at least upon the pressure data.

8. The method of claim 1, further comprising:
   receiving, from a motion sensor, motion data; and
   determining if a mood should be determined based upon the motion data.

9. The method of claim 1, further comprising displaying the first mood.

10. The method of claim 1, further comprising sending the first mood to a social network.

11. The method of claim 1, further comprising sending a title of a currently playing song to a social network.

12. The method of claim 1, wherein modifying the playlist comprises removing songs from the playlist associated with a previous mood.

13. The method of claim 12, wherein modifying the playlist further comprises not removing songs from the playlist that are associated with a mood independent playlist.

14. The method of claim 1, further comprising:
   receiving a second mood associated with a remote computing device;
   selecting one or more songs based upon the second mood; and
   modifying a playlist based upon the selected one or more songs based upon the second mood.

15. The method of claim 14, further comprising:
   receiving a target mood;
   selecting one or more songs based upon the target mood; and
   modifying a playlist based upon the selected one or more songs based upon the target mood.

16. The method of claim 1, further comprising sending the first mood to a remote computing device.

17. A pressure-sensing pen comprising:
   a pressure sensor configured to determine pressure data comprising an axial pen pressure and a time indication;
   a motion sensor configured to detect motion and position of the pen;
   a processor configured to:
      determine a first mood based upon the pressure data;
      select one or more songs based upon the determined first mood; and
      modify a playlist based upon the selected one or more songs; and
   a music player module configured to play the playlist; and
   a connectivity module configured to send song data based upon the playlist to a remote device.

18. The pressure-sensing pen of claim 17, further comprising:
   a memory configured to:
      store songs; and
      store playlists associated with moods.

19. The pressure-sensing pen of claim 17, wherein the connectivity module is further configured to receive a second mood associated with a paired-pen.

20. The pressure-sensing pen of claim 17, wherein the processor is further configured to:
   determine if the axial pen pressure is above a predetermined threshold for a predetermined duration based upon the pressure data; and
   activate the music player module based upon the determination.

21. The pressure-sensing pen of claim 17, wherein the remote device is a pair of headphones.

22. A non-transitory computer-readable medium having instruction stored thereon, the instructions comprising:
- instructions to determine pressure data comprising a pressure indication and a time indication;
- instructions to determine a first mood based upon the pressure data;
- instructions to select one or more songs based upon the determined first mood;
- instructions to modify a playlist based upon the selected one or more songs, wherein the modified playlist comprises the selected one or more songs;
- instructions to play the modified playlist; and
- instructions to transmit song data based upon the modified playlist to a remote device.

* * * * *